US009131021B2

(12) United States Patent
Bhogal et al.

(10) Patent No.: US 9,131,021 B2
(45) Date of Patent: *Sep. 8, 2015

(54) DYNAMIC SCREEN SHARING FOR OPTIMAL PERFORMANCE

(71) Applicant: International Business Machines Corporation, Armonk, NY (US)

(72) Inventors: Kulvir S. Bhogal, Pflugerville, TX (US); Gregory J. Boss, Saginaw, MI (US); Rick A. Hamilton, II, Charlottesville, VA (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 30 days.

This patent is subject to a terminal disclaimer.

(21) Appl. No.: 14/082,128

(22) Filed: Nov. 16, 2013

(65) Prior Publication Data

US 2014/0101253 A1    Apr. 10, 2014

Related U.S. Application Data

(63) Continuation of application No. 13/326,007, filed on Dec. 14, 2011.

(51) Int. Cl.
*G06F 15/16* (2006.01)
*H04L 29/06* (2006.01)
*G06F 3/14* (2006.01)
*G09G 5/04* (2006.01)

(52) U.S. Cl.
CPC ............ *H04L 65/403* (2013.01); *G06F 3/1454* (2013.01); *G09G 5/04* (2013.01); *G09G 2340/0407* (2013.01); *G09G 2340/0428* (2013.01); *G09G 2350/00* (2013.01); *G09G 2370/022* (2013.01)

(58) Field of Classification Search
None
See application file for complete search history.

(56) References Cited

U.S. PATENT DOCUMENTS

| 5,572,648 A | 11/1996 | Bibayan |
| 5,799,292 A | 8/1998 | Hekmatpour |
| 5,864,819 A | 1/1999 | De Armas et al. |

(Continued)

FOREIGN PATENT DOCUMENTS

| CN | 101567858 A | 4/2011 |
| EP | 0961197 A1 | 1/1999 |

(Continued)

OTHER PUBLICATIONS

"Screen Sharing Tools and Technology: A Mini-Guide," Kolabora; Oct. 5, 2006; accessed <http://www.kolabora.com/news/2006/10/05/screen_sharing_tools_and_technology.htm>, Whole Document.*

(Continued)

*Primary Examiner* — Thomas Dailey
(74) *Attorney, Agent, or Firm* — Yee & Associates, P.C.; Damion Josephs

(57) ABSTRACT

Illustrative embodiments disclose sharing an area of a computer system screen. A first computer system configures a sharing session for sharing a region of the screen with a second computer system. The first computer system assesses information on performance of the sharing session, determining from the information a minimum size of the region based on the assessment, and then selects the region to share based on the assessment and a designation by a user.

12 Claims, 5 Drawing Sheets

(56) References Cited

U.S. PATENT DOCUMENTS

| | | | |
|---|---|---|---|
| 6,052,676 A | 4/2000 | Hekmatpour | |
| 6,059,842 A | 5/2000 | Dumarot et al. | |
| 6,292,174 B1 | 9/2001 | Mallett et al. | |
| 6,654,032 B1 | 11/2003 | Zhu et al. | |
| 6,714,778 B2 | 3/2004 | Nykanen et al. | |
| 6,928,461 B2 | 8/2005 | Tuli | |
| 7,103,836 B1 | 9/2006 | Nakamura et al. | |
| 7,203,708 B2 | 4/2007 | Lin et al. | |
| 7,216,002 B1 | 5/2007 | Anderson | |
| 7,275,116 B1 | 9/2007 | Hanmann et al. | |
| 7,340,534 B2 | 3/2008 | Cameron et al. | |
| 7,360,166 B1 | 4/2008 | Krzanowski | |
| 7,386,801 B1 | 6/2008 | Horvitz et al. | |
| 7,454,386 B2 | 11/2008 | Chakraborty | |
| 7,530,020 B2 | 5/2009 | Szabo | |
| 7,620,621 B2 | 11/2009 | Fuselier et al. | |
| 7,660,604 B2 | 2/2010 | Ueda | |
| 7,672,873 B2 | 3/2010 | Kindig et al. | |
| 7,743,135 B2 | 6/2010 | Azuma | |
| 7,757,114 B2 | 7/2010 | Watanabe | |
| 7,801,896 B2 | 9/2010 | Szabo | |
| 7,853,900 B2 | 12/2010 | Nguyen et al. | |
| 7,860,962 B2 | 12/2010 | White et al. | |
| 7,925,616 B2 | 4/2011 | Hurwood et al. | |
| 8,225,229 B2 | 7/2012 | Thorn et al. | |
| 8,527,588 B2 | 9/2013 | Beck et al. | |
| 8,903,768 B2 | 12/2014 | Bhogal et al. | |
| 9,086,788 B2 | 7/2015 | Bhogal et al. | |
| 2002/0083092 A1 | 6/2002 | Simpson | |
| 2002/0140719 A1 | 10/2002 | Amir et al. | |
| 2003/0222876 A1* | 12/2003 | Giemborek et al. | 345/503 |
| 2003/0222890 A1 | 12/2003 | Salesin et al. | |
| 2004/0044691 A1 | 3/2004 | Wajda | |
| 2004/0253991 A1* | 12/2004 | Azuma | 455/566 |
| 2005/0004885 A1 | 1/2005 | Pandian et al. | |
| 2005/0132045 A1* | 6/2005 | Hornback et al. | 709/225 |
| 2005/0138540 A1 | 6/2005 | Baltus et al. | |
| 2005/0197906 A1 | 9/2005 | Kindig et al. | |
| 2006/0002315 A1* | 1/2006 | Theurer et al. | 370/261 |
| 2006/0014546 A1 | 1/2006 | Bodin et al. | |
| 2006/0041686 A1 | 2/2006 | Caspi et al. | |
| 2006/0056304 A1 | 3/2006 | Moore | |
| 2006/0066503 A1 | 3/2006 | Sampsell et al. | |
| 2006/0136828 A1 | 6/2006 | Asano | |
| 2006/0184508 A1 | 8/2006 | Fuselier et al. | |
| 2006/0288023 A1 | 12/2006 | Szabo | |
| 2007/0132727 A1 | 6/2007 | Garbow et al. | |
| 2007/0288584 A1 | 12/2007 | Tsai et al. | |
| 2008/0005233 A1 | 1/2008 | Cai et al. | |
| 2008/0018582 A1 | 1/2008 | Yang et al. | |
| 2008/0034320 A1* | 2/2008 | Ben-Shachar et al. | 715/790 |
| 2008/0133769 A1 | 6/2008 | Salesky et al. | |
| 2008/0154907 A1 | 6/2008 | Prasad et al. | |
| 2008/0246775 A1 | 10/2008 | Fisher et al. | |
| 2008/0275871 A1 | 11/2008 | Berstis et al. | |
| 2008/0288992 A1 | 11/2008 | Usman et al. | |
| 2009/0012821 A1 | 1/2009 | Besson et al. | |
| 2009/0013045 A1 | 1/2009 | Maes et al. | |
| 2009/0226152 A1* | 9/2009 | Hanes | 386/109 |
| 2009/0300020 A1 | 12/2009 | Chen et al. | |
| 2009/0313329 A1 | 12/2009 | Agrawal et al. | |
| 2010/0010921 A1 | 1/2010 | Liu et al. | |
| 2010/0131523 A1 | 5/2010 | Yu et al. | |
| 2010/0235285 A1 | 9/2010 | Hoffberg | |
| 2011/0029482 A1 | 2/2011 | Gimson et al. | |
| 2011/0029658 A1 | 2/2011 | Werth et al. | |
| 2011/0043652 A1 | 2/2011 | King et al. | |
| 2011/0078532 A1 | 3/2011 | Vonog et al. | |
| 2011/0078615 A1 | 3/2011 | Bier | |
| 2011/0085211 A1 | 4/2011 | King et al. | |
| 2011/0173256 A1 | 7/2011 | Khalatian | |
| 2011/0173266 A1 | 7/2011 | Ohashi et al. | |
| 2011/0195667 A1 | 8/2011 | Hassan et al. | |
| 2011/0258574 A1 | 10/2011 | Adams | |
| 2011/0314387 A1* | 12/2011 | Gold et al. | 715/751 |
| 2012/0004960 A1* | 1/2012 | Ma et al. | 705/14.4 |
| 2012/0016770 A1 | 1/2012 | Thomas | |
| 2012/0050320 A1 | 3/2012 | Verbeque et al. | |
| 2012/0084866 A1 | 4/2012 | Stolfo | |
| 2012/0182384 A1 | 7/2012 | Anderson et al. | |
| 2013/0151624 A1 | 6/2013 | Bhogal et al. | |
| 2013/0151973 A1 | 6/2013 | Bhogal et al. | |
| 2013/0151976 A1 | 6/2013 | Bhogal et al. | |
| 2013/0159021 A1 | 6/2013 | Felsher | |
| 2013/0159822 A1 | 6/2013 | Grossman et al. | |
| 2013/0159874 A1 | 6/2013 | Bhogal et al. | |
| 2013/0159880 A1 | 6/2013 | Bhogal et al. | |
| 2013/0326576 A1 | 12/2013 | Zhang et al. | |
| 2014/0075331 A1 | 3/2014 | Bhogal et al. | |
| 2014/0075341 A1 | 3/2014 | Bhogal et al. | |
| 2014/0082518 A1 | 3/2014 | Bhogal et al. | |
| 2014/0100927 A1 | 4/2014 | Bhogal et al. | |
| 2014/0129520 A1 | 5/2014 | Bhogal et al. | |

FOREIGN PATENT DOCUMENTS

| | | |
|---|---|---|
| JP | 11327523 A | 11/1999 |
| JP | 2005348262 A | 12/2005 |
| JP | 2006268638 A | 10/2006 |
| JP | 2006338531 A | 12/2006 |
| JP | 2008234072 A | 10/2008 |
| JP | 2009205278 A | 9/2009 |
| JP | 2011100270 A | 5/2011 |
| WO | 0198888 A2 | 12/2001 |
| WO | 0209086 A1 | 1/2002 |
| WO | 02054192 A2 | 7/2002 |
| WO | 2006127430 A1 | 11/2006 |
| WO | 2011161735 A1 | 12/2011 |

OTHER PUBLICATIONS

Bhogal et al., "Customizing a Presentation Based on Preferences of an Audience," U.S. Appl. No. 14/076,584, filed Nov. 11, 2013, 28 pages.

Bhogal et al., "Providing Feedback for Screen Sharing," U.S. Appl. No. 14/077,333, filed Nov. 12, 2013, 28 pages.

Bhogal et al., "Variable Refresh Rates for Portions of Shared Screens," U.S. Appl. No. 14/082,123, filed Nov. 16, 2013, 35 pages.

Office action regarding U.S. Appl. No. 13/668,294, dated Feb. 28, 2014, 15 pages.

Office action regarding U.S. Appl No. 13/668,294, dated Dec. 27, 2013, 15 pages.

Notice of allowance dated Apr. 22, 2014, regarding U.S. Appl. No. 13/323,681, 10 pages.

Office action dated Nov. 27, 2013, regarding U.S. Appl. No. 13/323,681, 20 pages.

Architecture for a Dynamic Information Area Control, IBM Technical Disclosure Bulletin, IBM Corp. New York, NY, 37 (10):245-246, Oct. 1, 1994.

Au et al., "Netscape Communicator's Collapsible Toolbars," In: CHI '98, Human Factors in Computing Systems, Conference Proceedings, ACM Press, New York, NY, pp. 81-86, Apr. 18, 1998.

Reimer et al., "Presence-Based, Context-Sensitive Real-Time Collaboration (RTC)—Research Directions for a New Type of eCollaboration System," 19th Bled eConference, eValues, Bled, Slovenia, Jun. 5-7, 2006, 16 pages.

Sato et al., "XFIG Version 3.2 Patchlevel 2 Users Manual," 4 pages. http://www.math.unm.edu/xfig/index.html, Jul. 2, 1998.

"Create Custom Shows within a Presentation in PowerPoint," Microsoft Corporation, http://www.office.microsoft.com/en-us/powerpoint-help/creat-custom-shows-within-a-presentation, accessed Mar. 12, 2012, 1 page.

Porst, "X.5 iChat," Quarter Life Crisis—The World According to Sven-S. Porst, http://earthlingsoft.net/ssp/blog/2007/12/x5_chat, accessed Mar. 12, 2012, 20 pages.

Yun, "Manage and Monitor Meeting Bandwidth," Acrobat® Connect Pro User Community, http://www.connectusers.com/tutorials/2009/03/connection_status/index.php?format, accessed Mar. 12, 2012, 5 pages.

(56) References Cited

OTHER PUBLICATIONS

Office Action, dated Aug. 15, 2014, regarding U.S. Appl. No. 14/082,123, 30 pages.
Office Action, dated Sep. 11, 2014, regarding U.S. Appl. No. 13/323,696, 28 pages.
Office Action, dated Aug. 15, 2014, regarding U.S. Appl. No. 13/325,950, 35 pages.
Notice of Allowance, dated Jul. 29, 2014, regarding U.S. Appl. No. 13/668,294, 19 pages.
Office Action, dated Feb. 27, 2015, regarding U.S. Appl. No. 13/326,007, 40 pages.
Final Office Action, dated Feb. 27, 2015, regarding U.S. Appl. No. 14/082,123, 20 pages.
Notice of Allowance, dated Mar. 13, 2015, regarding U.S. Appl. No. 14/082,132, 51 pages.
Final Office Action, dated Feb. 12, 2015, regarding U.S. Appl. No. 13/323,696, 25 pages.
Final Office Action, dated Feb. 26, 2015, regarding U.S. Appl. No. 13/325,950, 19 pages.
Notice of Allowance, dated Apr. 24, 2015, regarding U.S. Appl. No. 13/326,007, 14 pages.
Notice of Allowance, dated May 8, 2015, regarding U.S. Appl. No. 14/082,123, 14 pages.
Office Action, dated May 21, 2015, regarding U.S. Appl. No. 13/323,696, 28 pages.
Notice of Allowance, dated May 12, 2015, regarding U.S. Appl. No. 13/325,950, 14 pages.

* cited by examiner

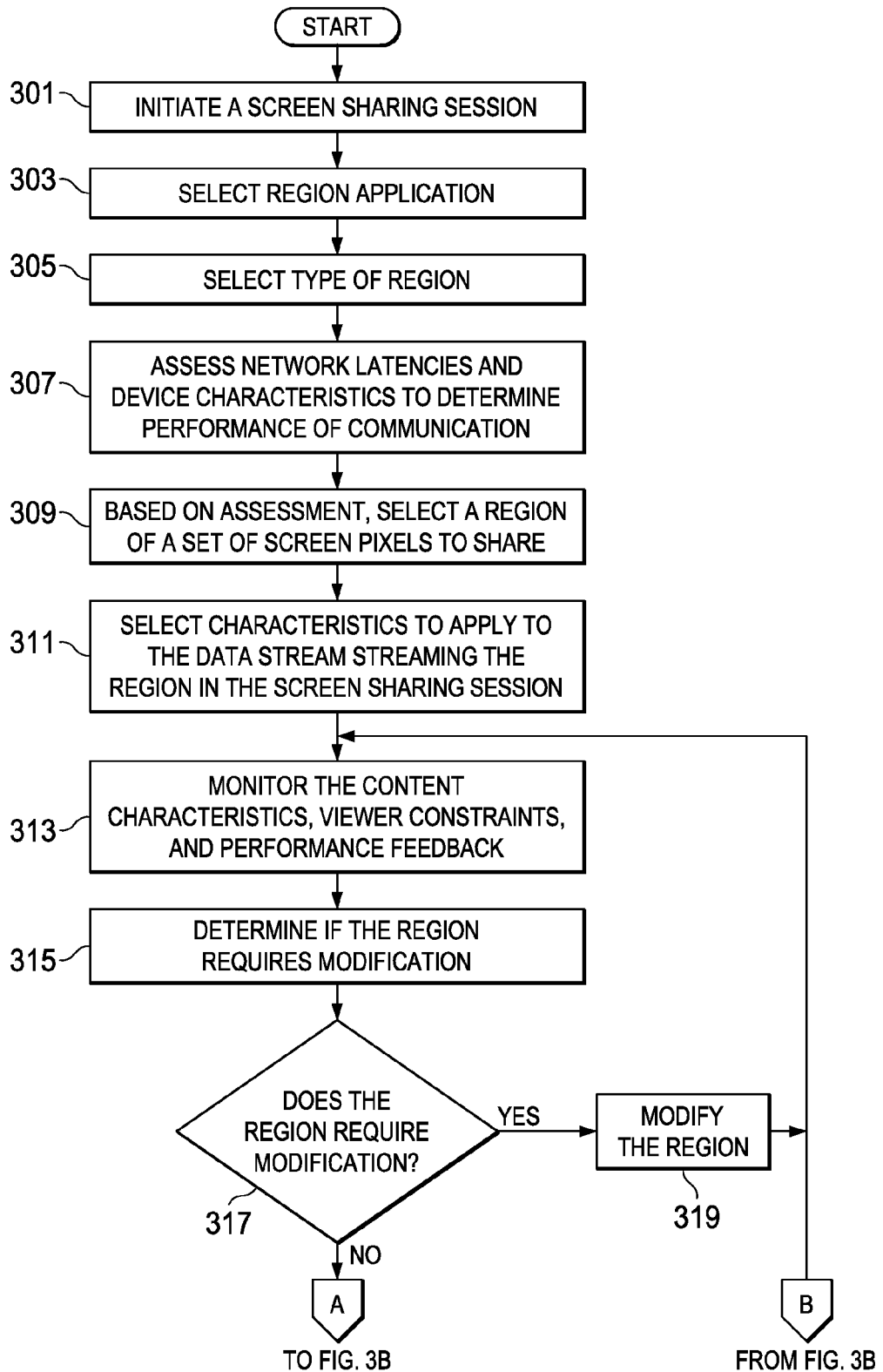

DYNAMIC SCREEN SHARING FOR OPTIMAL PERFORMANCE

This application is a continuation of application Ser. No. 13/326,007, filed Dec. 14, 2011.

BACKGROUND

1. Field

The disclosure relates generally to sharing an area of a screen of a data processing system and more specifically to sharing a subsection of the screen in a sharing session.

2. Description of the Related Art

Screen sharing allows users to share the contents of their computer display with remote colleagues and collaborators. However, depending on the content shown, bandwidth requirements for communication can be too high to accomplish sharing effectively. In many situations, users may only need to share a small portion of the total screen. Currently, this is accomplished by selectively sharing only a highlighted application window. In practical terms, this means that a user chooses to share, for example, the window associated with only a collaboration application and no other window of the desktop. Alternatively, screen-sharing applications may vary refresh rate or resolution of the shared screen. However, these options may not permit optimal display of the content, depending on the nature of what is being shared. Occasions may exist when sharing even one application window may be prohibitive for available bandwidth, particularly when the shared area contains motion or other aspects requiring heightened bandwidth. Further, while a user may try to reduce the size of a shared window, image quality and detail may suffer as a result.

Current solutions for sharing screen content between users are generalized with a "one size fits all" approach and do not adequately account for varying connection speeds. For example, when presentations are given using screen sharing software, the audio sent over a first network can get ahead of a display being shared over a second network due to bandwidth issues in the second network. Users may have to wait for the presentation to catch up. Further, users may only need to share a small area of the application screen that is relevant to a particular conversation.

Therefore, it would be advantageous to have a method and apparatus that takes into account at least some of the issues discussed above, as well as possibly other issues.

SUMMARY

Illustrative embodiments disclose sharing an area of a computer system screen. A first computer system configures a sharing session for sharing a region of the screen with a second computer system. The first computer system assesses information on performance of the sharing session, determining from the information a minimum size of the region based on the assessment, and then selects the region to share based on the assessment and a designation by a user.

BRIEF DESCRIPTION OF THE SEVERAL VIEWS OF THE DRAWINGS

FIG. 3A is an illustration of a flowchart of a session sharing process in accordance with an illustrative embodiment;

DETAILED DESCRIPTION

Figure 1:
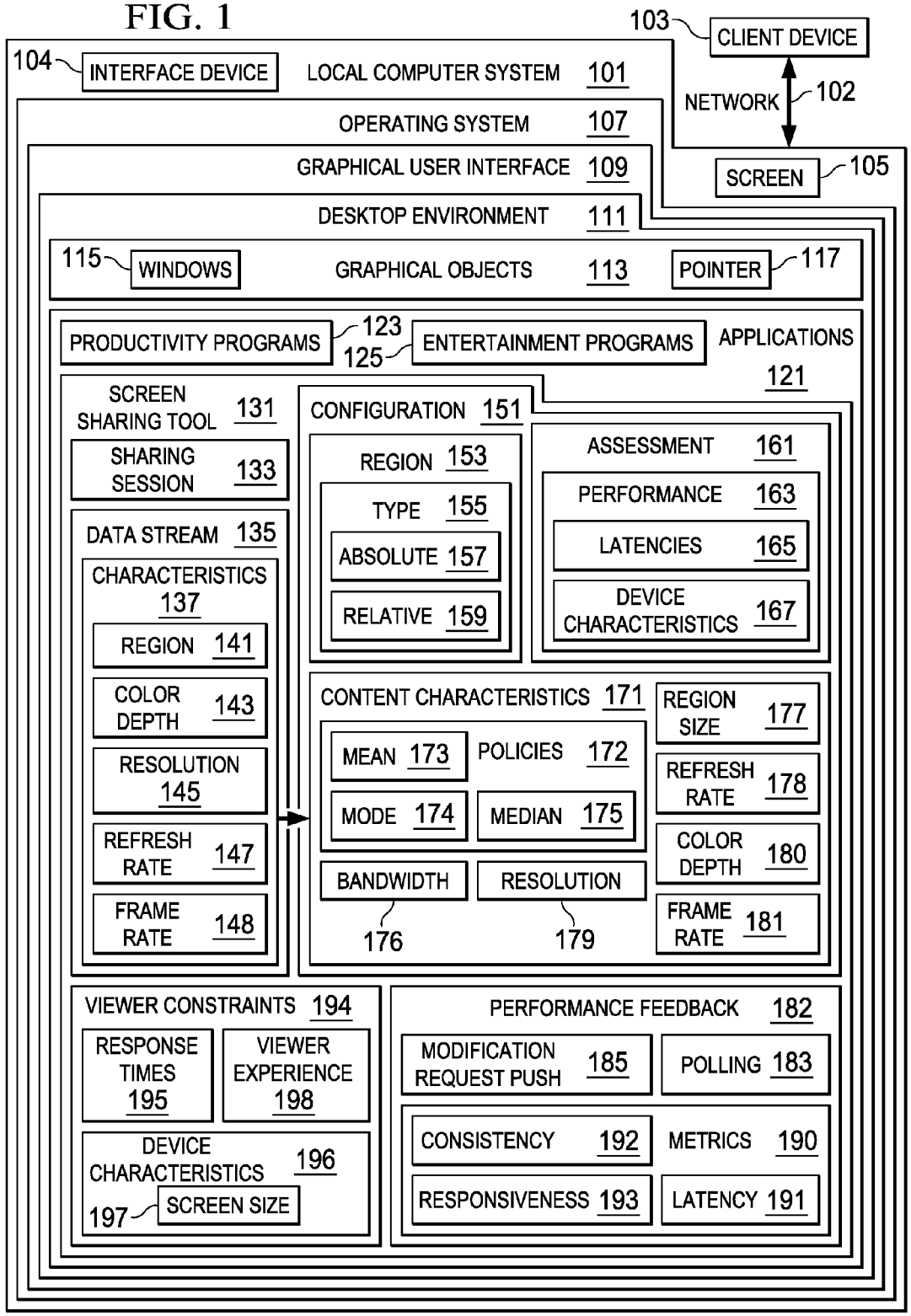
FIG. 1 is an illustration of a block diagram of a session sharing environment in accordance with an illustrative embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible computer readable medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The manipulation of data in a data processing system is well known in the prior art. Data may be manipulated in many ways in a modern state-of-the-art data processing system including: data accessing, data encoding, data communications, data compression, data conversion, data entry, data exchange, data filing, data linking, data locking, data manipulation, data mapping, data modeling, data processing, data recording, data sorting, and data transferring. The large amounts of data that are available to the user of modern state-of-the-art data processing system often become overwhelming in magnitude and complexity. These situations may often arise in the creation and execution of multimedia presentations.

Data processing systems are capable of communicating information to users in many formats, including: text, graphics, sounds, animated graphics, synthesized speech, and video. Multimedia presentations employ a data processing system to combine such information formats into a coherent and comprehensive presentation to the user.

As a result of the increasing complexity of data processing systems and with the introduction of multimedia presentations, attempts have been made to simplify the interface between a user and the large amounts of data present within a modern data processing system. One example of an attempt to simplify the interface between a user and a data processing system is the utilization of a so-called graphic user interface (GUI) to provide an intuitive and graphical interface between the user and the data processing system. A GUI is an interface system, including devices, by which a user interacts with a system, system components, and/or system applications via windows or view ports, icons, menus, pointing devices, etc.

Although GUIs have made manipulation of data easier for users in some instances, GUIs have created new problems. For example, a user working in an application frequently selects items from an application menu toolbar. This interaction will require the user to move a pointer via a mouse over a graphical object such as a menu, icon, or control to make a selection.

The term "mouse," when used in this document, refers to any type of operating system supported graphical pointing device including, but not limited to: a mouse, track ball, touch pad, light pin, touch screen, and the like. A pointing device is typically employed by a user of the data processing system to interact with the data processing system's GUI. A "pointer" is an iconic image controlled by a mouse or other such device, and is displayed on the video display device of a data processing system to visually indicate to the user icons, menus, or other types of graphical objects that may be selected or manipulated.

Turning now to FIG. 1, an illustration of a block diagram of a session sharing environment is depicted in accordance with an illustrative embodiment. It should be appreciated that FIG. 1 is only provided as an illustration of one implementation and is not intended to imply any limitation with regard to the environment in which different embodiments may be implemented. Many modifications to the depicted environment may be made.

As depicted, session sharing environment 100 includes local computer system 101. As depicted, local computer system 101 communicates over network 102 with client devices 103. In these illustrative examples, network 102 can include both wired and wireless communication links. As depicted, local computer system 101 includes interface device 104 and screen 105. Interface device 104 includes, for example, a computer mouse, touchscreen, trackball, pointing stick, touchpad, or keyboard. Screen 105 includes, for example, any display device for presenting visual data to a user of local computer system 101. As used herein, "computer system" means any type of data processing system, such as, for example, a computer, laptop, notebook, mobile phone, or tablet.

As depicted, local computer system 101 utilizes operating system 107 to function. As used herein "operating system" means a set of programs for managing computer hardware resources and application software. In these illustrative examples, operating system 107 includes, for example, Linux®, Android®, iOS®, MAC OS X®, Microsoft Windows®, and any other system for managing computer hardware resources and application software. As depicted, operating system 107 includes graphical user interface (GUI) 109, such as commonly encountered in a Windows® or MAC OS X® environment, and typically reacts to a clickable input from interface device 104 on local computer system 101 to receive command and control user inputs. As used herein "set of" means one or more.

As depicted, graphical user interface 109 comprises desktop environment 111. As defined and used herein, desktop environment 111 refers to a style of graphical user interface 109 derived from a metaphor to a desktop seen on most modern personal computers allowing a user to easily access, configure, and modify features of operating system 107. As depicted, desktop environment 111 consists of graphical objects 113 including windows 115 and pointer 117. As depicted, desktop environment 111 also includes applications 121. As depicted, applications 121 includes, for example, productivity programs 123 and entertainment programs 125 as well as screen sharing tool 131. In these illustrative embodiments, screen sharing tool 131 can establish sharing session 133, in which a user of local computer system 101 can share desktop environment 111 with other computers, such as client devices 103, using network 102.

As depicted, screen sharing tool 131 includes data stream 135. As depicted, data stream 135 comprises characteristics 137. As depicted, characteristics 137 of data stream 135 comprise region 141, color depth 143, resolution 145, refresh rate 147, and frame rate 148. In these illustrative examples, local computer system 101 can identify a region 141 of desktop environment 111 by drawing a box around an area on screen 105 to share through use of screen sharing tool 131. In these illustrative examples, a user of local computer system 101 dynamically shares a selected portion of the screen by selecting region 141. Screen sharing tool 131 transmits region 141 in data stream 135. In these illustrative examples, region 141 can be manually selected by a user using a drop down menu, icon, or other graphical representation on graphical user interface 109. For example, a user may use pointer 117 or other suitable user input device to designate the size, shape and location of region 141. Alternatively, region 141 can be generated based on a defined area around pointer 117, such as, for example, a radius from pointer 117.

In these illustrative examples, color depth 143 is the number of bits used to specify the color of a single pixel in a bitmapped image or video frame. A higher value for color depth 143 results in a broader range of distinct colors but requires higher transmission bandwidth. In these illustrative examples, resolution 145 specifies the number of pixels in region 141. For example, region 141 may be a rectangle that is N pixels high by M pixels wide. Resolution 145 is typically expressed with the set of two positive integer numbers, wherein the first number is the number of pixel columns, or width, and the second is the number of pixel rows, or height, for example expressed as 640 by 480. However, other conventions are used to express resolution 145, such as, for example, the total number of pixels in the image, typically given as number of megapixels, which can be calculated by determining the number of pixels in region 141 and dividing by 1048576. In these illustrative examples, other conventions for defining resolution 145 include describing pixels per length unit or pixels per area unit, such as pixels per inch or per square inch.

In these illustrative examples, refresh rate 147 can also be referred to as "vertical refresh rate" or "vertical scan rate" and refers to the number of times in a second that screen 105 draws data, i.e., draws a frame. This measured value is not to be confused with frame rate 148, in that refresh rate 147 includes the repeated drawing of identical frames on screen 105, while frame rate 148 measures how often operating system 107 feeds an entire frame of new data to screen 105. In these illustrative examples, frame rate 148 is the frequency, or rate, at which the operating system 107 produces unique consecutive images or frames. Frame rate 148 is most often expressed in frames per second (FPS).

As depicted, configuration 151 comprises selections to configure screen sharing tool 131 and parameters for making those selections. As depicted, configuration 151 for region 153 includes types 155. In these illustrative examples, types 155 comprise absolute 157 and relative 159 mapping for region 153; that is region 153 can be mapped either absolute 157 or relative 159 to the window. Absolute 157 mapping assigns certain picture elements of the screen 105 to be displayed, until the user stipulates cancellation or changes the display elements. Region 153 stays constant, and this area will be presented even if the user opens other application windows, resizes applications, or makes other changes in the desktop environment 111. In other words, absolute 157 mapping exists independently of all windows 115, so region 153 remains fixed in place relative to screen 105 even if windows 115 move. Relative 159 mapping assigns a certain region 153 for display within one of windows 115, and this region 153 moves with the associated window of windows 115. In other words, relative 159 mapping exists dependently on one of windows 115 and tracks with movement, so region 153 remains in the same relative location and fixed in place relative to the window rather than screen 105.

As depicted, assessment 161 includes assessing performance 163 of client devices 103 considering network latencies 165 and device characteristics 167. In these illustrative examples, local computer system 101 assesses performance 163 of sharing session 133 using network latencies 165 and device characteristics 167 to quantify communication quality, i.e., performance of sharing session 133, of data stream 135. In these illustrative examples, network latencies 165 is a time delay experienced in network 102 for communication to transit from local computer system 101 and arrive at a set of client devices 103. In these illustrative examples, device characteristics 167 comprises size, pixel count, and resolution of the screen, maximum refresh rate and frame rate, clock speed, current bit rate, current data transfer rate, i.e., maximum bandwidth available, current response time and latency, and available memory.

As depicted, local computer system 101 uses content characteristics 171 to modify region 153 and data stream 135 and maintain sharing session 133. Content characteristics 171 includes common elements found in data stream 135 characteristics 137, but content characteristics 171 also include other attributes that are not in data stream 135. As depicted, content characteristics 171 comprise policies 172 comprised of mean 173, mode 174, and median 175. As depicted, content characteristics 171 also comprise bandwidth 176, region size 177, refresh rate 178, resolution 179, color depth 180, and frame rate 181. In these illustrative examples, many, but not all, characteristics 137 of data stream 135 are identical to content characteristics 171. Further, in these illustrative examples, it is important to note that region size 177, refresh rate 178, resolution 179, color depth 180, and frame rate 181 all effect bandwidth 176, and changes in any one of these content characteristics 171 affects bandwidth 176.

As depicted, screen sharing tool 131 also comprises performance feedback 182, comprised of polling 183 or modification request push 185 to monitor metrics 190. In these illustrative examples, polling 183 includes local computer system 101 requesting metrics 190 from client devices 103. In these illustrative examples, modification request push 185 includes client devices 103 transmitting metrics 190 to local computer system 101. As depicted, metrics 190 comprise latency 191, consistency 192, and responsiveness 193. In these illustrative examples, latency 191 includes, for example, delay encountered by one of client devices 103 in network 102 in responding to an input or displaying region 153 after transmission. In these illustrative examples, consistency 192 refers to the validity, accuracy, usability and integrity of data transmission, such as for example of region 153, between local computer system 101 and one of client devices 103. Users of client devices 103 should receive a consistent view region 153. In these illustrative examples, responsiveness 193 refers to the ability of one of client devices 103 to complete assigned tasks within a given time interval, such as for example processing data stream 135 to display region 153. As depicted, client device constraints 194 comprise response time 195, device characteristics 196 including screen size 197, and viewer experience 198. In these illustrative examples, response time 195 is the time that a client device takes to respond to an input. In these illustrative examples, device characteristics 196 are various characteristics of one of client devices 103 that effect sharing session 133 and the quality of received communication. Viewer experience 198 is calculated from several performance related factors and provides an objective measure of user-perceived communication quality. In these illustrative examples, monitoring content characteristics 171, performance feedback 182 from client devices 103, and client device constraints 194 allows screen sharing tool 131 to dynamically adjust characteristics 137 of data stream 135 and maintain acceptable communication quality.

Figure 2:
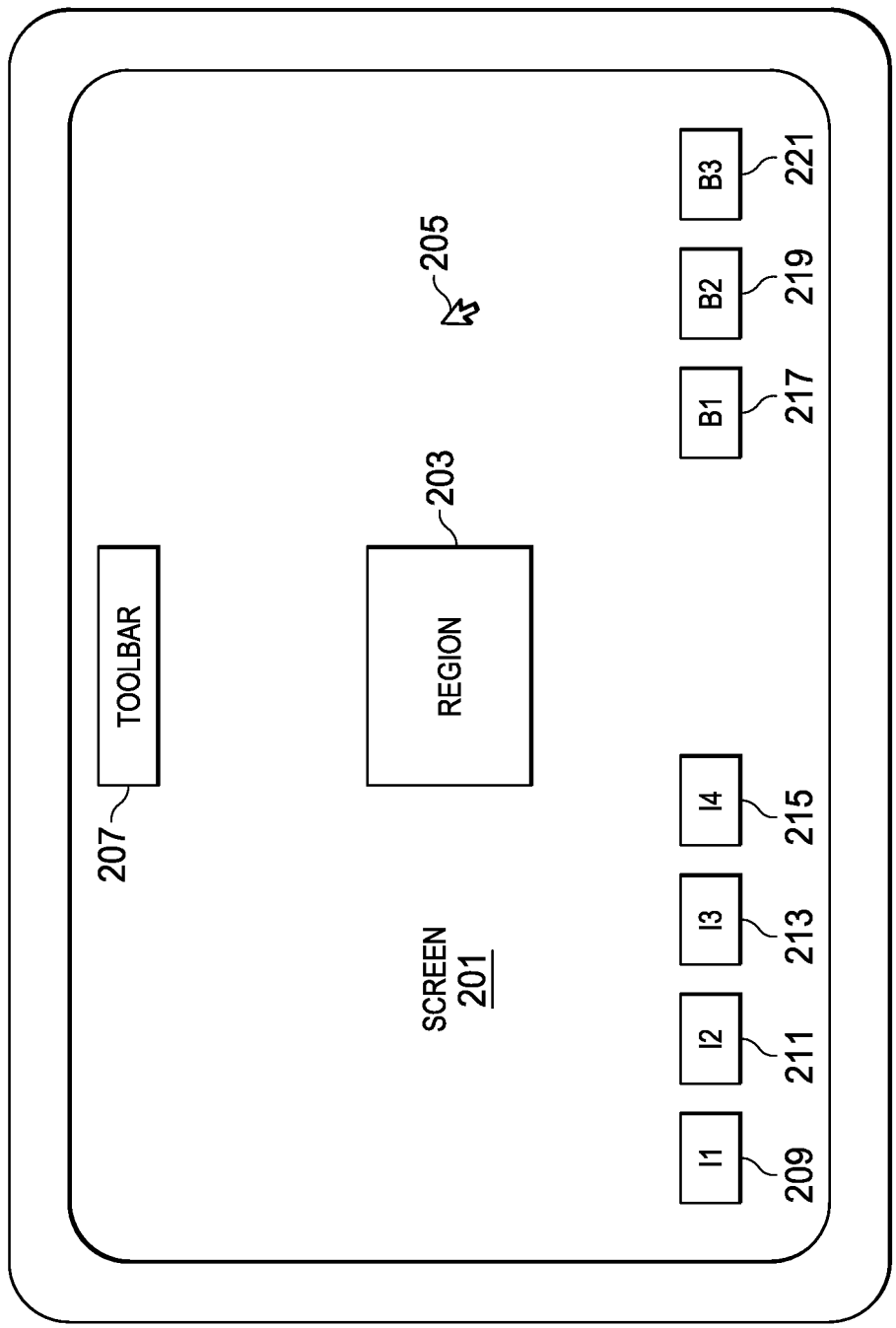
FIG. 2 is an illustration of a screen on the local computer system in accordance with an illustrative embodiment.

Turning now to FIG. 2, an illustration of a computer screen on a local computer system in accordance with an illustrative embodiment is depicted. It should be appreciated that FIG. 2 is only provided as an illustration of one implementation and is not intended to imply any limitation with regard to the computer displays in which different embodiments may be implemented. Many modifications to the depicted computer screen may be made.

As depicted, screen on local computer system 200 shows an illustrative example of a view of a computer screen implemented with windows. As depicted, with reference to FIG. 1, screen 201 on local computer system 101 comprises a number of features providing visual data and control interfaces to a user of local computer system 101. As depicted, screen 201 includes region 203. In these illustrative examples, region 203 comprises a pixel map of a set of pixels of an area of screen 201. Typically, a user defines region 203 using a drop down menu, icon, or other logical input to indicate an area of screen 201 to include in region 203, which is passed to screen sharing tool 131. For example, a user can create a pixel map of region 203 using a drop down menu and pointer 117 to draw a rectangle around an area of screen 201 to designate as region 203. This pixel map of region 203 is passed to screen sharing tool 131 designating region 203. In these illustrative examples, region 203 can be drawn as regular, simple shapes, such as rectangles or circles, or complex irregular shapes of any usable form for selecting a useable region of screen 201. Furthermore, region 203 may include a set of regular and irregular shapes, and there can further be more than one region 203 defined on screen 201.

In these illustrative examples, region 203 can also be created by defining an area around, for example, pointer 205. The shape and size of region 203 can be dynamically adjusted as required, either automatically or by a user, based on content characteristics 171, performance feedback 182 from client devices 103, and client device constraints 194. For example, content characteristics 171 can change so that shape of region 203 requires changing to fully encompass data desired to be shared, such as in the case of a new frame displayed with a desired area of screen 201 shifted, as in, for example, a word processing program changing to display a page break instead of text in the middle of screen 201. In another illustrative example, performance feedback 182 from client devices 103 can indicate loss of available bandwidth 176 or excessive response time 195, and to compensate, screen sharing tool 131 can reduce the size of region 203 and needed bandwidth 176 required.

As depicted, screen 201 also comprises icon I1 235, icon I2 236, icon I3 237, and icon I4 238, which can provide a clickable link and appear as a pictogram providing a representation of a software tool, a function, or a data file accessible on local computer system 101 to access a software tool, a function, or a data file using interface device 104 of FIG. 1, or in other words, for example, using pointer 205. As depicted, button B1 240, button B2 241, and button B3 242 can provide a clickable link to input a command, like starting a query at a search engine, or to interact with dialog boxes, like confirming an action. As depicted, toolbar 207 comprises multiple on-screen buttons, icons, menus, or other input or output elements arranged in a row, which provide visual pictograms used to quickly navigate within local computer system 101 of FIG. 1 to access a software tool, function, or data file or provide a simple way to input a command, like starting a query at a search engine, or to interact with dialog boxes, like confirming an action.

Figure 3B:
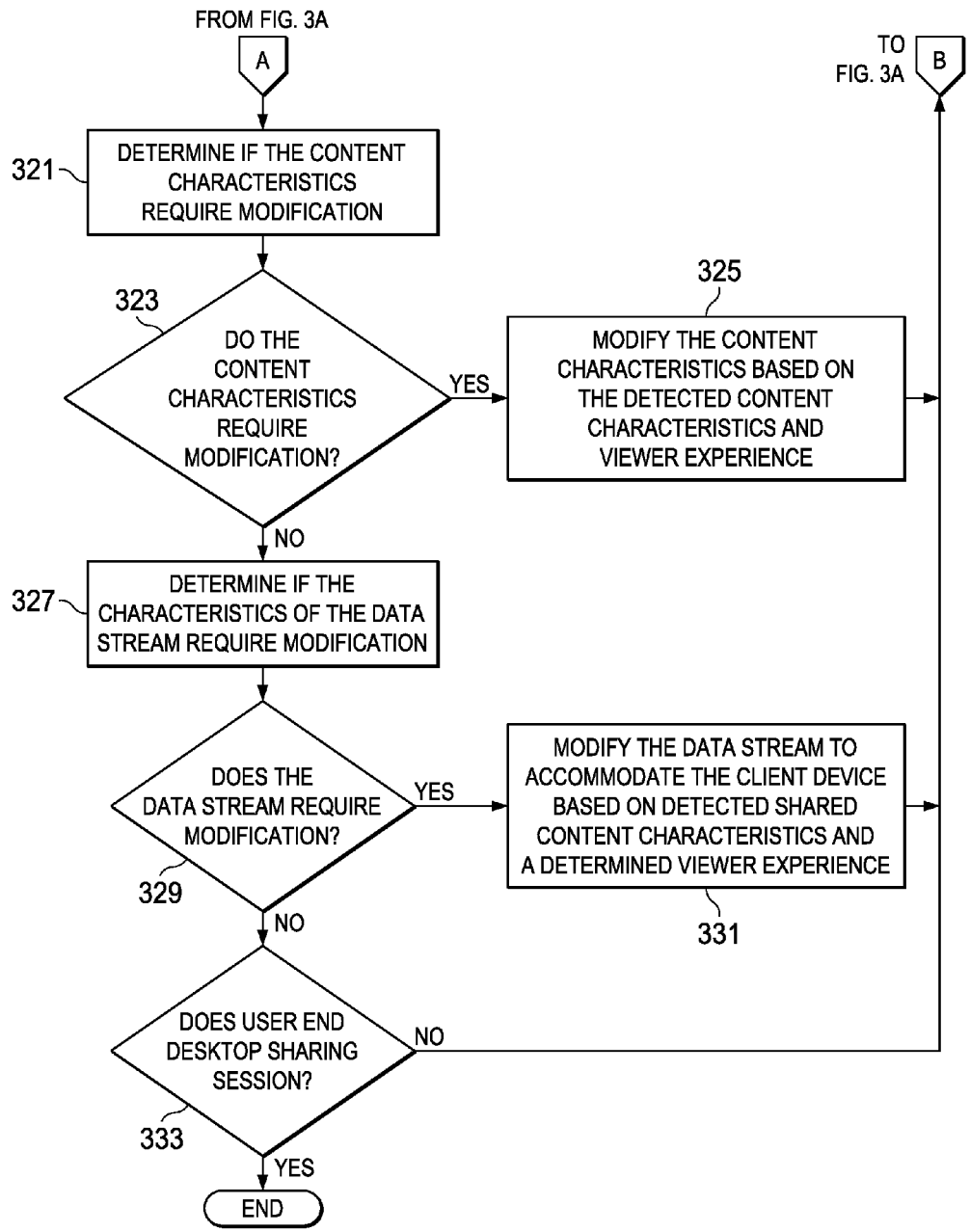
FIG. 3B is an illustration of a flowchart of a session sharing process in accordance with an illustrative embodiment.

In FIG. 3A and FIG. 3B, an illustration of a flowchart of a dynamic screen sharing process in accordance with an illustrative embodiment is depicted. It should be appreciated that FIG. 3A and FIG. 3B are only provided as an illustration of one implementation and is not intended to imply any limitation with regard to the screen sharing process in which different embodiments may be implemented. Many modifications to the depicted screen sharing process may be made.

As depicted, session sharing process 300 can be implemented in screen sharing tool 131 of FIG. 1. With references to elements in FIG. 1, as depicted, the process begins when local computer system 101 initiates sharing session 133 (step 301) and selects the region application (step 303). Region application refers to an application used to designate region 153 of desktop environment 111 to share. As depicted, local computer system 101 selects the type of region 153, such as for example, absolute 157 or relative 159 (step 305). As depicted, local computer system 101 assesses network latencies 165 and device characteristics 167 to determine performance of communication (step 307), and, based on the assessment, selects region 153 of a set of screen pixels to share (step 309). In these illustrative examples, selecting region 153 may also include selecting a policy from policies 172. As depicted, policies include mean 173, mode 174, and median 175. In these illustrative examples, when mean 173 is selected, local computer system 101 obtains client devices 103 details and averages these to ascertain optimal content characteristics 171, e.g., characteristics 137 for data stream 135, for transmission. In these illustrative examples, when mode 174 is selected, local computer system 101 shares and transmits region 153 based on the most common characteristics among client devices 103 details. In these illustrative examples, when median 175 is selected, local computer system 101 shares and transmits region 153 based on the median characteristics among client devices 103.

As depicted, local computer system 101 next selects content characteristics 171 to apply to data stream 135 streaming region 153 in screen sharing session 133 (step 311). In these illustrative examples, data stream 135 is generated with characteristics 137 set to provide a desired performance, adjusting region 141, color depth 143, resolution 145, or refresh rate 147 as required.

As depicted, local computer system 101 monitors content characteristics 171, client device constraints 194, and performance feedback 182 (step 313). In these illustrative examples, content characteristics 171 comprises bandwidth 176, region size 177, refresh rate 178, resolution 179, color depth 180, and frame rate 181. Client device constraints 194 comprise response time 195, device characteristics 196, including screen size 197, and viewer experience 198, which, for example, can also be monitored using polling 183 or modification request push 185. In these illustrative examples, local computer system 101 monitors performance of each of client devices 103 using periodic polling 183 of client devices 103 or receiving modification request push 185 from client devices 103 with metrics 190 of performance on each of client devices 103. In these illustrative examples, local computer system 101 uses these monitored attributes to dynamically adjust region 153, content characteristics 171, or data stream 135.

As depicted, local computer system 101 determines if region 153 requires modification (step 315). As depicted, if region 153 requires modification (step 317), then local computer system 101 modifies region 153 (step 319) before returning to step 313. In these illustrative examples, local computer system 101 can modify region size 177, color depth 180, or type 155 of region 153. As depicted, if region 153 does not require modification (step 317), then local computer system 101 determines if content characteristics 171 require modification (step 321).

As depicted, if content characteristics 171 require modification (step 323), then local computer system 101 modifies content characteristics 171 based on the detected content characteristics 171 and viewer experience 198 (step 325) before returning to step 313. As depicted, local computer system 101 can modify one or more of bandwidth 176, region size 177, refresh rate 178, resolution 179, color depth 180, and frame rate 181. Bandwidth 176, in these illustrative examples, can be associated with, and determined or changed by, color depth 180, pixel count, e.g., region size 177, refresh rate 178, and frame rate 181.

As depicted, if content characteristics 171 do not require modification (step 323), then local computer system 101 determines if characteristics 137 of data stream 135 require modification (step 327). As depicted, if characteristics 137 of data stream 135 do require modification (step 329), then local computer system 101 modifies data stream 135 to accommodate the client device based on detected shared content characteristics 171 and a determined viewer experience 198 (step 331) before proceeding to step 313. In these illustrative examples, to modify data stream 135, for example, local computer system 101 can modify region 141, e.g., region size 177, color depth 143, resolution 145, refresh rate 147, and frame rate 148. As depicted, if characteristics 137 of data stream 135 do not require modification (step 329), then local computer system 101 proceeds to step 333, where if the user ends sharing session 133, the process ends (step 333). As depicted in step 333, if the user does not end the sharing session 133, then the process returns to step 313.

In these illustrative examples, consider a user sharing content on a 1600×1200 screen with client devices 103 viewing shared content on a first client device with a screen size 197 of 1024×768, a second client device with a screen size 197 of 1280×1024, and a third client device with a screen size 197 of 1400×1200. As described above, screen sharing tool 131 can receive performance feedback 182 and client device constraints 194 and then operate to adjust region size 177 or other content characteristics 171 to accommodate all client devices 103, adjust region size 177 or other content characteristics 171 to accommodate the majority of client devices 103, or adjust region size 177 or other content characteristics 171 for each individual ones of client devices 103 to provide the largest possible view of region 153 to the largest number of client devices 103. Logical functionality can determine bandwidth 176 and screen size 197 for each of client devices 103 and modify region 153, content characteristics 171, or data stream 135 to send a proportionate amount of screen 105 accordingly to maintain performance on all of client devices 103, the majority of client devices 103, or adjust for each one of client devices 103 to provide the largest region 153 possible.

Figure 4:
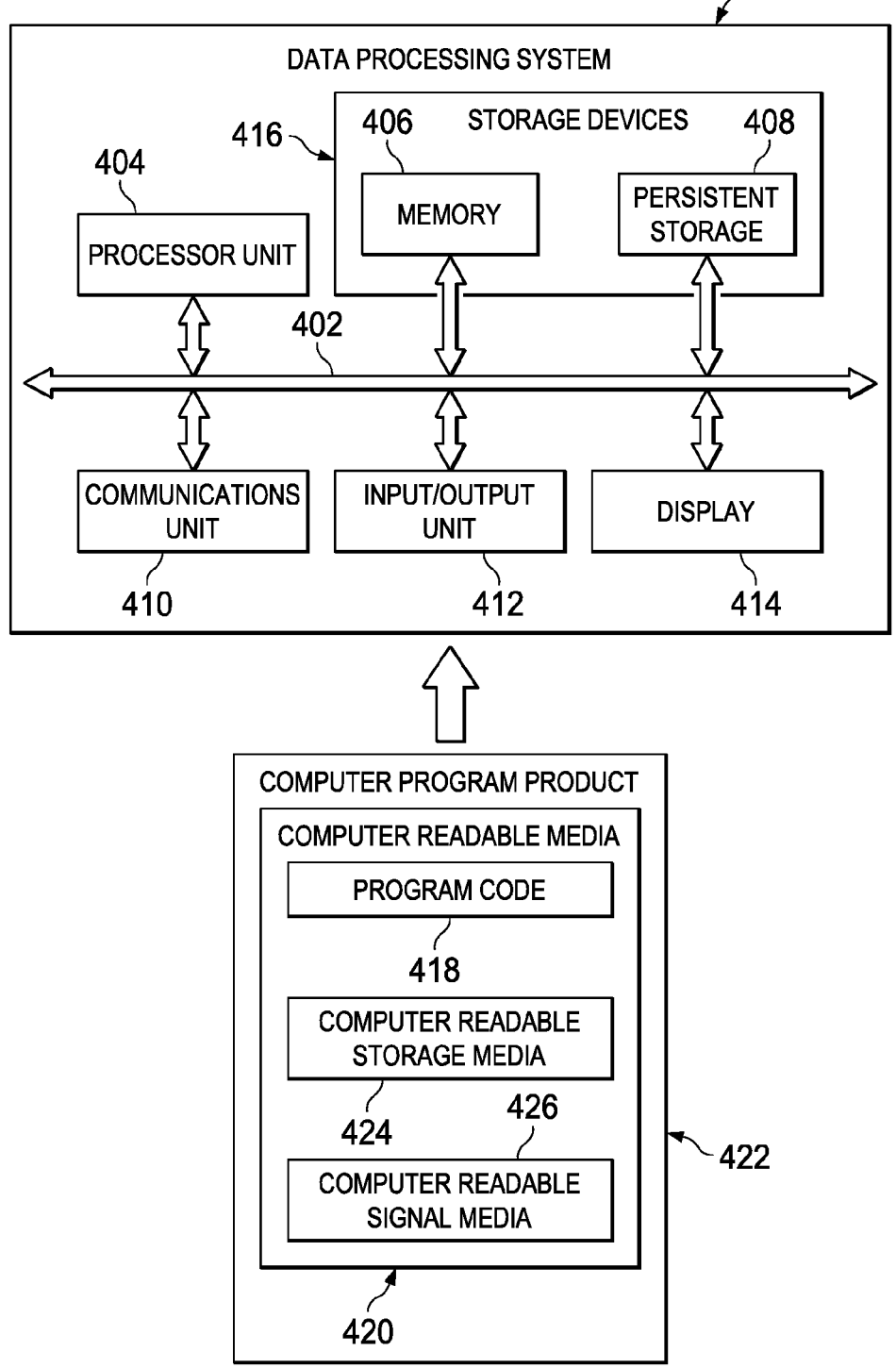
FIG. 4 is an illustration of a block diagram of a data processing system in accordance with an illustrative embodiment.

Turning now to FIG. 4, an illustration of a data processing system is depicted in accordance with an advantageous embodiment. Data processing system 400 may be used to implement local computer system 101 in FIG. 1. In this illustrative example, data processing system 400 includes communications framework 402, which provides communications between processor unit 404, memory 406, persistent storage 408, communications unit 410, input/output (I/O) unit 412, and display 414. In this example, communication framework may take the form of a bus system.

Processor unit 404 serves to execute instructions for software that may be loaded into memory 406. Processor unit 404 may be a number of processors, a multi-processor core, or some other type of processor, depending on the particular implementation.

Memory 406 and persistent storage 408 are examples of storage devices 416. A storage device is any piece of hardware that is capable of storing information, such as, for example, without limitation, data, program code in functional form, and/or other suitable information either on a temporary basis and/or a permanent basis. Storage devices 416 may also be referred to as computer readable storage devices in these illustrative examples. Memory 406, in these examples, may be, for example, a random access memory or any other suitable volatile or non-volatile storage device. Persistent storage 408 may take various forms, depending on the particular implementation.

For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these illustrative examples, provides for communications with other data processing systems or devices. In these illustrative examples, communications unit 410 is a network interface card.

Input/output unit 412 allows for input and output of data with other devices that may be connected to data processing system 400. For example, input/output unit 412 may provide a connection for user input through a keyboard, a mouse, and/or some other suitable input device. Further, input/output unit 412 may send output to a printer. Display 414 provides a mechanism to display information to a user.

Instructions for the operating system, applications, and/or programs may be located in storage devices 416, which are in communication with processor unit 404 through communications framework 402. The processes of the different embodiments may be performed by processor unit 404 using computer-implemented instructions, which may be located in a memory, such as memory 406.

These instructions are referred to as program code, computer usable program code, or computer readable program code that may be read and executed by a processor in processor unit 404. The program code in the different embodiments may be embodied on different physical or computer readable storage media, such as memory 406 or persistent storage 408.

Program code 418 is located in a functional form on computer readable media 420 that is selectively removable and may be loaded onto or transferred to data processing system 400 for execution by processor unit 404. Program code 418 and computer readable media 420 form computer program product 422 in these illustrative examples. In one example, computer readable media 420 may be computer readable storage media 424 or computer readable signal media 426.

In these illustrative examples, computer readable storage media 424 is a physical or tangible storage device used to store program code 418 rather than a medium that propagates or transmits program code 418.

Alternatively, program code 418 may be transferred to data processing system 400 using computer readable signal media 426. Computer readable signal media 426 may be, for example, a propagated data signal containing program code 418. For example, computer readable signal media 426 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 400 are not meant to provide architectural limitations to the manner in which different embodiments may be implemented. The different advantageous embodiments may be implemented in a data processing system including components in addition to and/or in place of those illustrated for data processing system 400. Other components shown in FIG. 4 can be varied from the illustrative examples shown. The different embodiments may be implemented using any hardware device or system capable of running program code 418.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product for sharing a region of a computer system screen, comprising:
    a non-transitory computer readable storage medium;
    program code, stored on the non-transitory computer readable storage medium, for selecting an application to generate the region on the screen of a first computer system to share with a second computer system in a sharing session, wherein the application configures the first computer system to share the region with the second computer system using a screen sharing tool, and wherein the region is defined by a user of the first computer system to dynamically share a selected portion of the screen by creating a pixel map of the region wherein the region is selectively defined using regular, simple shapes, including rectangles or circles, complex irregular shapes of a usable form for selecting a useable region of screen, and a set of regular and irregular shapes, and wherein the region further comprising one or more regions defined on the screen;
    program code, stored on the non-transitory computer readable storage medium, for assessing information on performance of the sharing session, including assessing performance of client devices;
    program code, stored on the non-transitory computer readable storage medium, for determining from the information on performance a minimum size of the region based on the assessment; and
    program code, stored on the non-transitory computer readable storage medium, for selecting the region to share based on the assessment and a designation by a user.

2. The computer program product of claim 1, wherein the information on performance of the sharing session includes latencies of the sharing session and characteristics of the second computer system.

3. The computer program product of claim 1, further comprising:
    program code, stored on the non-transitory computer readable storage medium, for monitoring a characteristic of content in the sharing session, a constraint of the second computer system, and a feedback of performance from the second computer system; and
    program code, stored on the non-transitory computer readable storage medium, for modifying the region, a characteristic of the content being shared, or a characteristic of a data stream in the sharing session as required to maintain performance.

4. The computer program product of claim 3, further comprising program code, stored on the non-transitory computer readable storage medium, for monitoring the second computer system, wherein the monitoring comprises periodic polling of the second computer system for information on performance or receiving a request to modify the sharing session.

5. The computer program product of claim 1, further comprising:
    program code, stored on the non-transitory computer readable storage medium, for determining characteristics of a data stream to use in the sharing session based on the information on performance of the sharing session and the region.

6. The computer program product of claim 1, wherein the assessing information on performance comprises assessing a bandwidth requirement based on a resolution characteristic, a refresh rate characteristic, and a color depth characteristic of the region.

7. A data processing system for sharing a region of a computer system screen in a sharing session, the data processing system comprising:
   a bus system;
   a storage device connected to the bus system, wherein the storage device stores program code;
   a processor unit connected to the bus system, wherein the processor unit executes the program code:
   to select an application to generate the region on the screen of a first computer system to share with a second computer system in a sharing session, wherein the application configures the first computer system to share the region with the second computer system using a screen sharing tool, and wherein the region is defined by a user of the first computer system to dynamically share a selected portion of the screen by creating a pixel map of the region wherein the region is selectively defined using regular, simple shapes, including rectangles or circles, complex irregular shapes of a usable form for selecting a useable region of screen, and a set of regular and irregular shapes, and wherein the region further comprising one or more regions defined on the screen;
   to assess information on performance of the sharing session, including assessing performance of client devices;
   to determine from the information on performance a minimum size of the region based on the assessment; and
   to select the region to share based on the assessment and a designation by a user.

8. The data processing system of claim 7, wherein the information on performance of the sharing session includes latencies of the sharing session and characteristics of the second computer system.

9. The data processing system of claim 7, wherein the processor unit executes the program code to monitor a characteristic of content in the sharing session, a constraint of the second computer system, and a feedback of performance from the second computer system; and to modify the region, a characteristic of the content being shared, or a characteristic of a data stream in the sharing session as required to maintain performance.

10. The data processing system of claim 7, wherein the processor unit executes the program code to monitor the second computer system, wherein the monitoring comprises periodic polling of the second computer system for information on performance or receiving a request to modify the sharing session.

11. The data processing system of claim 7, wherein the processor unit executes the program code to determine characteristics of a data stream to use in the sharing session based on the information on performance of the sharing session and the region.

12. The data processing system of claim 7, wherein the assessed information on performance comprises an assessed bandwidth requirement based on a resolution characteristic, a refresh rate characteristic, and a color depth characteristic of the region.

* * * * *